United States Patent [19]
Austin

[11] Patent Number: 5,950,175
[45] Date of Patent: *Sep. 7, 1999

[54] SYSTEM FOR MANAGING REAL ESTATE SWAP ACCOUNTS

[75] Inventor: Clive H. Austin, New York, N.Y.

[73] Assignee: Merrill Lynch, Pierce, Fenner & Smith Incorporated, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/322,505

[22] Filed: Oct. 14, 1994

[51] Int. Cl.⁶ ................................................... G06F 17/60
[52] U.S. Cl. .............................................. 705/35; 705/36
[58] Field of Search ............................. 364/408; 705/35, 705/36

[56] References Cited

U.S. PATENT DOCUMENTS

| | | |
|---|---|---|
| 4,346,442 | 8/1982 | Musmanno . |
| 4,376,978 | 3/1983 | Musmanno . |
| 4,597,046 | 6/1986 | Musmanno et al. . |
| 4,674,044 | 6/1987 | Kalmus et al. . |
| 4,700,297 | 10/1987 | Hagel, Sr. et al. . |
| 4,752,877 | 6/1988 | Roberts et al. . |
| 4,774,663 | 9/1988 | Musmanno et al. . |
| 4,774,664 | 9/1988 | Campbell et al. . |
| 4,953,085 | 8/1990 | Atkins . |
| 5,083,270 | 1/1992 | Gross et al. . |
| 5,126,936 | 6/1992 | Champion et al. . |
| 5,182,770 | 1/1993 | Medveczky et al. . |
| 5,206,803 | 4/1993 | Vitagliano et al. . |
| 5,235,507 | 8/1993 | Sackler et al. . |
| 5,237,500 | 8/1993 | Perg et al. . |
| 5,270,922 | 12/1993 | Higgins . |
| 5,297,032 | 3/1994 | Trojan et al. . |
| 5,490,243 | 2/1996 | Millman et al. . |
| 5,655,085 | 8/1997 | Ryan et al. . |
| 5,673,402 | 9/1997 | Ryan et al. . |
| 5,689,649 | 11/1997 | Altman et al. . |

OTHER PUBLICATIONS

PC Version of Property Management III Scheduled for Release in Late Spring, RealData Review, Spring 1989, vol. 1, No. 1, pp. 1–4.

Haden W. Edwards, Biweekly Mortgages: All Dressed Up and Nowhere to Go?, Bottomline, Jun. 1987, pp. 37, 38, and 40.

Selling Biweekly Mortgage Payments, Bottomline, Jan. 1985, pp. 37 and 38.

Blalock, Joseph; "Understanding Reverse Mortgages"; Saving & Community Banking; V3N9 pp. 42–43, Sep., 1994.

*Primary Examiner*—Emanuel Todd Voeltz
*Assistant Examiner*—William N. Hughet
*Attorney, Agent, or Firm*—Hopgood, Calimafde, Kalil & Judlowe LLP

[57] ABSTRACT

A data processing system for managing a plurality of discrete accounts. Each account provides a swap between a property holder and the plan manager wherein the holder dilutes their exposure to the real estate market by exchanging future appreciation of the property for a current cash flow stream. The system thereafter implements the packaging of plural accounts into baskets of real estate assets and sells this real estate exposure to the institutional market. The data processor retains a system equilibrium by continuously updating the relative positions and the control parameters influencing these positions.

19 Claims, 8 Drawing Sheets

SYSTEM FOR MANAGING REAL ESTATE SWAP ACCOUNTS

The present invention generally relates to systems for managing a plurality of equity based accounts for reducing single market exposure and, in particular, a data processing system for implementing controlled dilution of select holdings of a plurality of individual accounts in accordance with plan directives.

BACKGROUND OF THE INVENTION

For as long as investment has been passionately pursued, the watchword has been diversification. Holders of stocks are routinely told to expand their bond position so that a turn in the market may be better weathered. Likewise, holders of fixed income securities are warned of the ravages of inflation, which may be best warded off through high growth but volatile stocks. Indeed, most investors think in terms of portfolio management, where their portfolio is carefully balanced to consider offsetting positions in various securities. Health Care stocks may combined with oil stocks; cyclicals combined with growth—each combination with the intent to dilute the negative impact that may strike one sector of the economy.

Typical in most investor's assets is some form of real estate investment. Real estate, as an investment vehicle, has attributes that are quite distinctive when compared to other forms of securities such as stocks and bonds. There are several methods of investing in real estate. First, and most often recognized, is the direct purchase of land or property—to be managed by the investor. Many a real estate empire has come and gone based simply on purchasing properties using borrowed money, with the expectation that the value and income of the property will exceed the interest paid on the loan. This is known as leverage, and with its great potential for success is the possibility of sizable failure. Other forms of real estate investment exist, all of which can be characterized as holding, derivative interest in property. This is done either by separate corporations, limited partnerships (REITS) or other bifurcated vehicles designed to limit the investor from the extremes of good and bad turns in the real estate market.

Surprisingly, most investors have sizeable if not dominating real estate holdings—without appreciating the substantial position taken. This, of course, comes about through the purchase of a home which in many areas of the country involves hundreds of thousands of dollars of borrowed money with the borrowing at significant interest rates. Indeed, the average investor with a portfolio of $50,000 may have a further position in real estate—due to their house—of another $350,000. In this scenario, the investors real estate position is 85% of the total portfolio. This is routinely referred to as being real estate "heavy" and runs counter to the established principles of diversification.

The repercussions of this are clear; down turns in the real estate market will dominate and deplete an otherwise well-balanced and successful portfolio of stocks and bonds. This has happened in the late 1980s in many areas of this country and many other industrialized countries, sizably reducing the net worth of many investors; whereas, the equity markets in general have performed well, real estate, at best, has been a turbulent market. There is, therefore, a great incentive for investors to dilute their real estate exposure. On the other hand, there are presently no investment vehicles to reduce this exposure in a cost effective manner.

OBJECTS AND SUMMARY OF THE PRESENT INVENTION

It is, therefore, an object of the present invention to provide a system to implement an investment vehicle that is tied to the real estate market so as to provide investment participants the ability to reduce their exposure to the real estate market.

It is another object of the present invention to provide a data processing system that manages a plurality of separate accounts associated with participants to insure compliance with the terms of the transaction and to update portfolio positions accordingly.

It is yet another object of the present invention to provide a system to aggregate a plurality of diverse positions into a unified investment offering to large institutional investors.

The above and other objects of the present invention are realized in a novel data processing system designed to manage a plurality of real estate investment accounts. On the retail side of the operation, the system manager provides to a plurality of individuals with large holdings in real estate, such as homeowners, the opportunity to reduce their exposure to changes in the real estate market. The system implements individual contracts with each property holder, wherein a cash stream at a fixed rate is exchanged for a future stake in the appreciation of the property. In effect, the property holder is trading a stake in their real estate holding, expressed in percentage terms, for a fixed income return. The system parameters are engineered to maintain and manage the arrangement to the conclusion and thereby monitors and accepts interim modifications based on, e.g., home improvements, etc. Upon conclusion of the arrangement, the property is sold and the proceeds representing incremental appreciation of the property are then applied to the original owner and plan manager in percentages corresponding to their individual stakes.

In accordance with the varying aspects of the present invention, the plan manager in turn converts the foregoing agreements with the property owners into transactable securities for resale in the institutional markets. Pension fund managers desiring a position in real estate will commit funds corresponding to the contract with the agreement permitting sharing in the appreciation of the property upon sale thereof. The system tracks the transactions and balances the various positions to insure compliance with the terms and conditions of the arrangement.

The foregoing features may be more fully appreciated by review of a specific illustrative example of the present invention taken in conjunction with drawings of which:

DESCRIPTION OF THE PRESENT INVENTION

First, briefly in overview, the present invention is directed to a data processing system for managing a plurality of accounts and transactions relating to the controlled dilution of individuals exposure in the real estate market. Operation of the system is by the plan manager, who communicates to participating individuals through a network of mortgage servicers. These servicers collect the salient data from the applicants and convey the information to the plan manager, where a qualification check is made. This qualification is made based on a set of pre-determined system constraints implemented to contour the resulting aggregate position in real estate to a form marketable to institutional investors.

The plan manager (system) operates in real time, updating accounts pursuant to events that either change or terminate the relationship with the participating individuals. On the institutional side, the system manages the investment by a plurality of institutional investors into real estate derivative products tied to the value of the stake taken by the plan manager. In this context, system parameters are controlled through an interface trust linking the investors to the plan manager and system operator.

Figure 1:
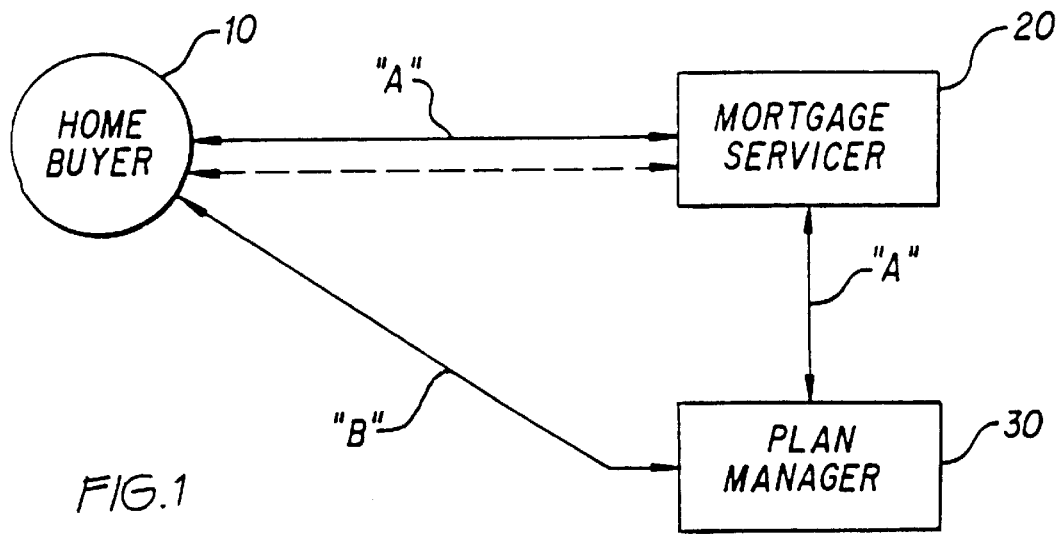
FIG. 1 is a block diagram of constituent participants in the transactions associated with the present invention.

With the foregoing discussion in mind, attention is first directed to FIG. 1, wherein the plan manager and its operative communicative arrangement is presented. In this context, the individual participant is either a home buyer or home owner, 10, who operates in conjunction with a mortgage servicer (typically a bank) 20. The relationship may exist due to previous mortgage transactions, or is nascent.

The mortgage servicer offers a specific contract to the home buyer that exchanges a fixed income cash flow, based on a percentage of the property value for the same percentage stake in the future appreciation of that property at sale (termination of the contract). For example, a house has a purchase price of $100,000; the owner can contract away 50% of the appreciation of this house in exchange for a fixed income on the $50,000 (50% of the purchase price). In a sense, the owner is swapping the exposure of $50,000 worth of real estate for a fixed return, similar to that of a bond.

In this arrangement, the system operator and plan manager are one and the same; all incoming new accounts collected by mortgage servicers are processed by the plan manager 30 and approved or disapproved by the plan manager. Although communication is by path "A"; the legal relationship, "B" is directly between the plan manager and the home buyer 10.

Figure 2:
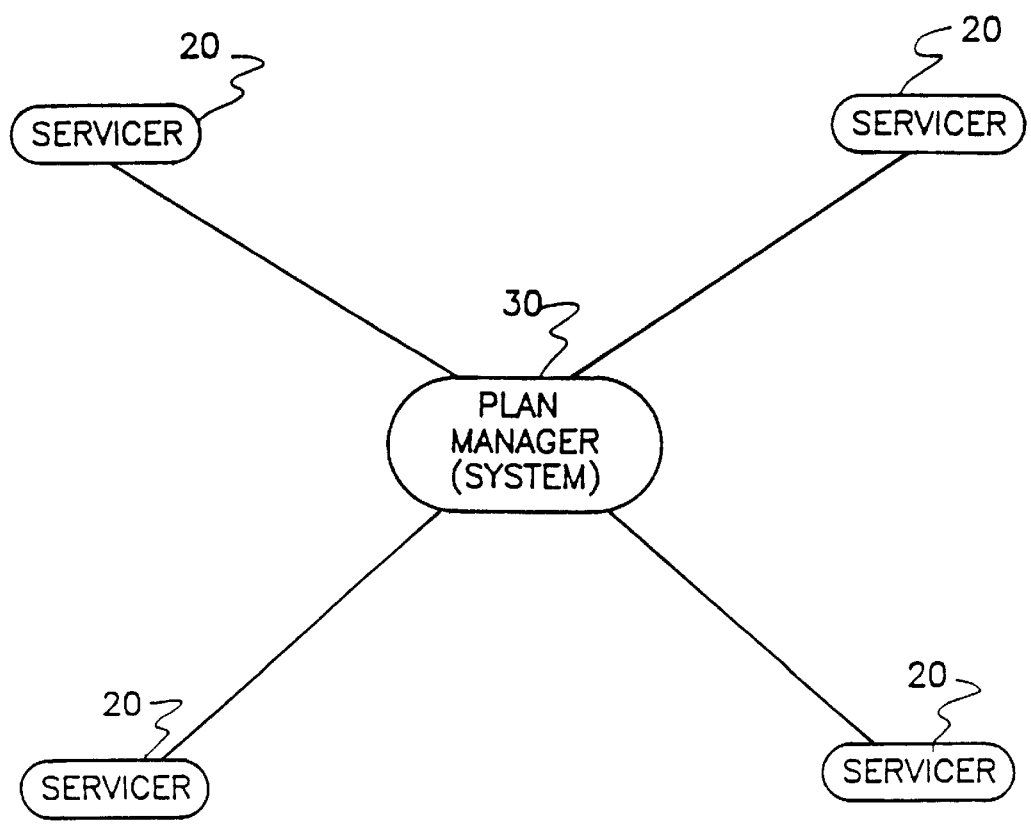
FIG. 2 is a block diagram of the relationship between the plan manager and the various servicers as implemented in the context of the present invention.

Turning now to FIG. 2, the plan manager 30 is the hub of a network of separate mortgage servicers 20, providing a plurality of real estate transactions paralleling the above example to numerous applicants, each through a discrete channel. The hubspoke structure permits simplified communications to each servicer. This is important as a single check for, e.g., $1,400,000 is distributed to one servicer, to be redistributed to the individual plan participants by the servicer in accordance with the specific allocations dictated by their contract. It is, therefore, important that each servicer has a separate database for all the participants in their domain; while the plan manager has one unified database for all participants.

Figure 3:
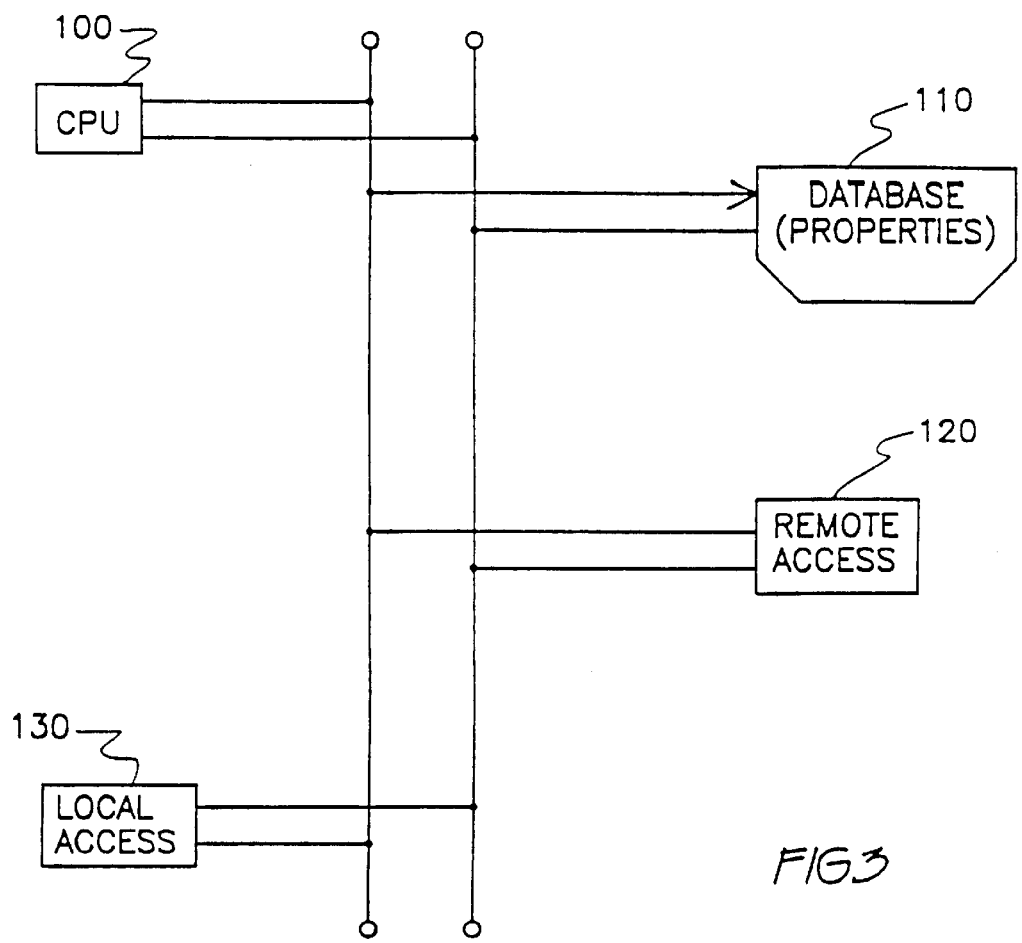
FIG. 3 is a block diagram of the operative hardware used to implement the present invention.

In this context, and now turning attention to FIG. 3, the plan manager employs a specific data processing system having a central processing unit (CPU) 100 in communication with a real time database 110. The database can be maintained in one of many available storage systems, including optical or magnetic, with search and access controlled by the CPU in accordance with the governing software. As can be appreciated by the networked nature of the system, both local access 130 and remote access 120 to the system is important for day-to-day operations.

Figure 4:
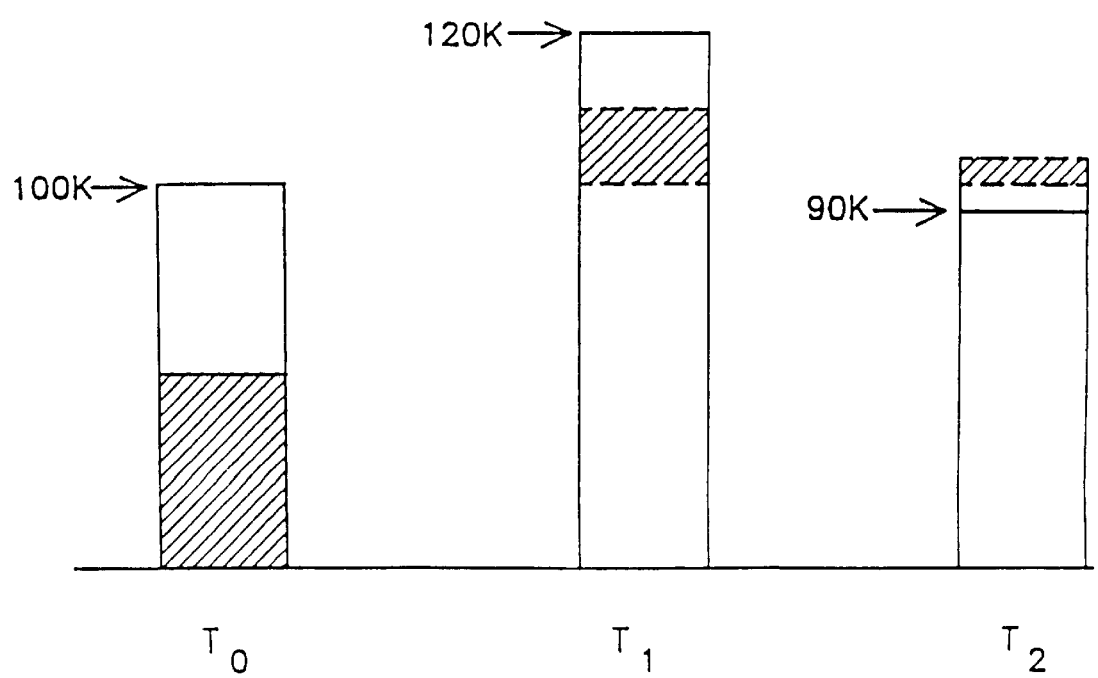
FIG. 4 is a chart indicating graphically the division of assets accomplished in conjunction with the present invention.

The nature of the transaction managed by the system is the swap of the future growth or shrinkage of a real estate asset for a fixed income return. This is presented graphically in FIG. 4, where a $100,000 house is charted at $T_o$. At this initial point, the homeowner elected to swap $50,000 (50%) of the house value as an investment, for a fixed return of 5% (5% on the $50,000 per year). The homeowner begins collecting immediately, while living in the same house. At some future time, $T_1$, the house is placed on the market for $120,000; if sold at this price, the incremental capital gains of $20,000 is divided in half—50% for homeowner and 50% for the plan manager.

If, on the other hand, the owner dies at $T_2$, the house has lost value and is sold for $90,000, and the plan manager owes the owner's estate $5,000 (50% of depreciation). Alternatively, a separate arrangement may be offered wherein no downside or loss exposure exists for the plan manager.

System operation is program controlled The program statements implement the various system functions on a real time basis or overnight basis, updating the database of accounts, approving new participants, and orchestrating the institutional side of the transactions. The controlling programs operate on hardware facilities compatible to the functions outlined herein, and the use of conventional hardware systems for processing and data storage is acceptable. The programming language isn't limitative so long as it is compatible with the selected operating system and hardware platform. Acceptable results will be achieved using a network of PC workstations tied together and linked to a file server or mini-computer.

The governing logic for controlling system operation is depicted in the flow charts as described hereinbelow. First, turning to FIG. 5, this flow chart depicts the initial application process for home buyer/owner as channeled to the system through the servicer. Logic starts conceptually at block 200 and continues to block 210 wherein the USER is given an identifying index variable "I". In this context:, the USER(I) is the applicant for diluting a position in property presently owned or to be purchased. At test 220, the system determines whether a new purchase is contemplated.

If "NO", logic proceeds to block 230 and the system collects a select profile of data, the key of which is an independent appraisal of the property AP(I) so that a proper valuation may be entered and used for the requisite calculations. On the other hand, a positive response to test 220 will branch logic to block 240 and data is collected on the purchase price of the house PP(I) to be used for base-line valuation.

Figure 5:
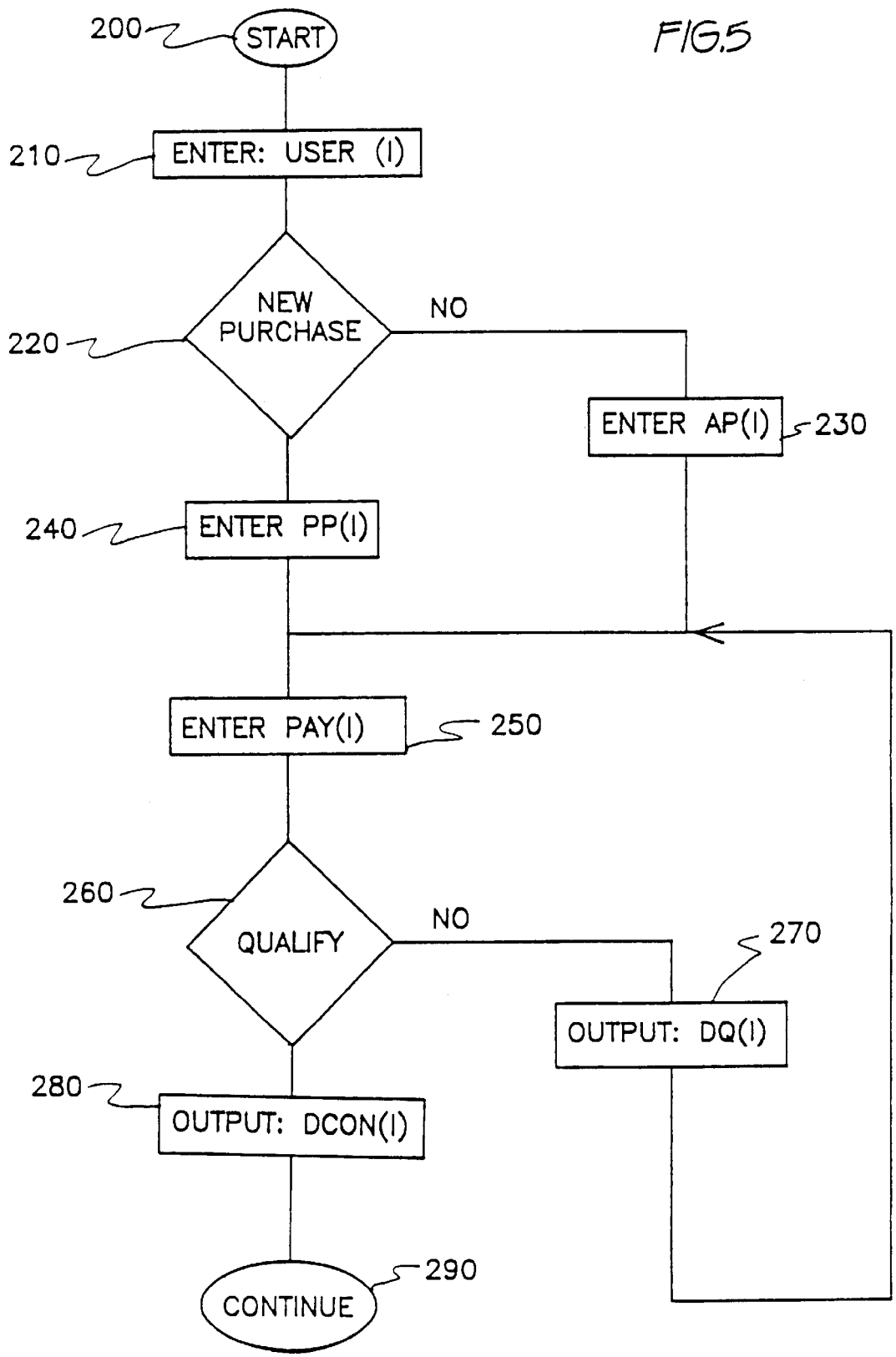
FIG. 5 is a logic flow diagram for the initial operation of the present invention.

Continuing in FIG. 5, processing invariably proceeds to block 250 wherein the percentage and value of the property to be swapped by the applicant is entered by the System and combined with the other data in the USER(I) file. Using this data, the system then screens the applicant to confirm compliance with the qualification elements of the system. For example, the percentage of property to be "swapped" or invested must be between 25% to 65%, the property must be a primary residence of 1 to 4 units; also, the property cannot be a co-op, land or used for investment purposes by the applicant. The minimum amount to be swapped is $30,000 or other applicable value. If the applicant fails for any of these or other reasons, the system responds negatively to test 260, and logic proceeds to block 270, where a report on the failed application and reasons therefor is printed as DQ(I).

Assuming applicant's data meets the specifications of the system, test 260 is answered in the affirmative and logic branches to block 280 where the specifics of the CONTRACT are printed and transmitted, via the servicer, back to the applicant for execution. System logic then proceeds with the next applicant in the same fashion (continue block 290), indexing the applicant counter:

$$I=I+1$$

Figure 6:
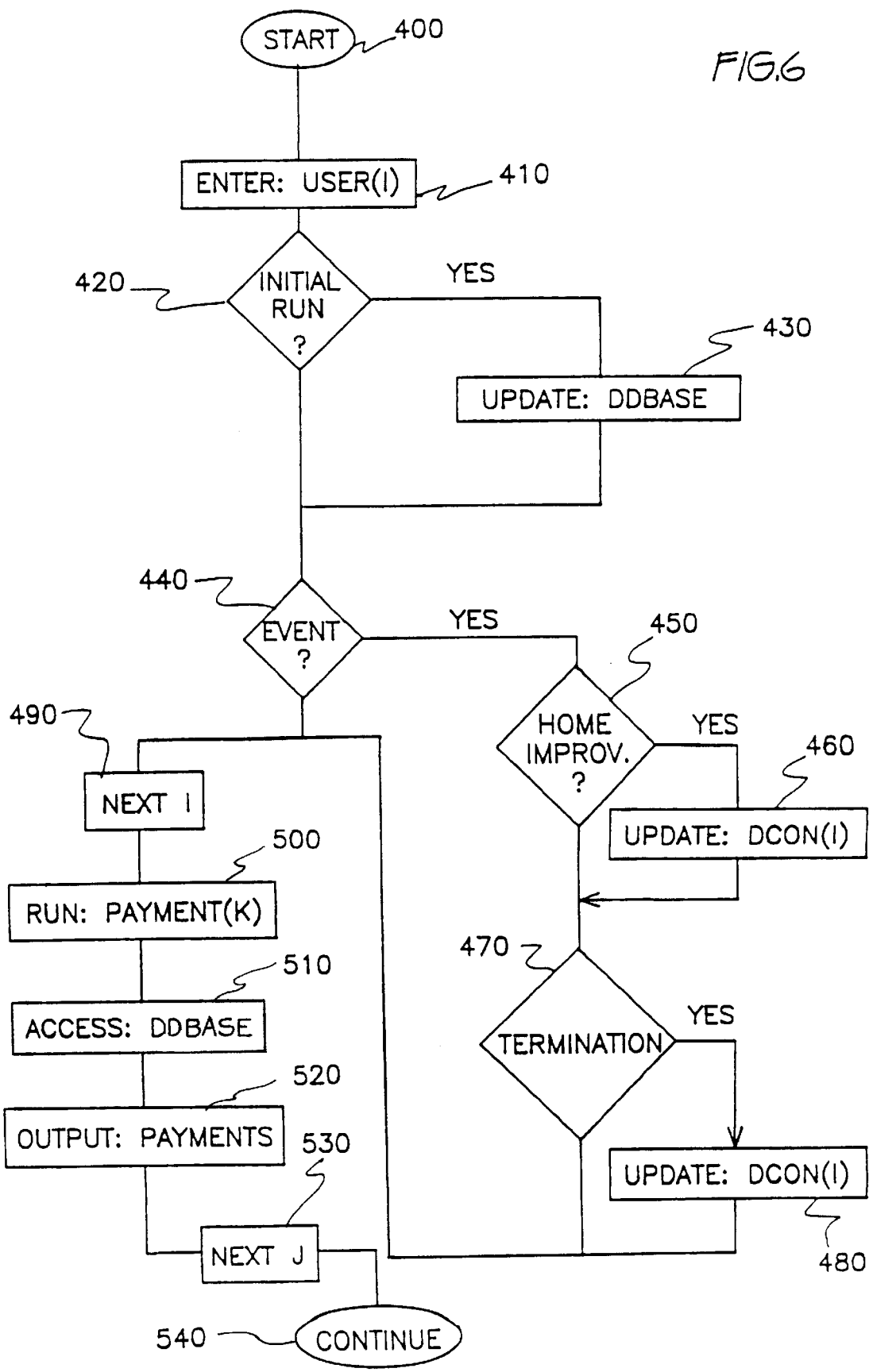
FIG. 6 is a logic flow diagram for on-going operations of the plan manager.

In accordance with the above process, the system quickly develops a substantial database of applicants, which require periodic updating pursuant to the terms of the transactions. This process is accomplished as described in FIG. 6. Specifically, logic begins at Start block 400 and continues to block 410 for entry of USER(I,J) wherein the J index variable tracks the time period of the entries.

The system first tests whether the USER(I,J) is an initial run, test 420; if so, logic branches to block 430 and the main database, DDbase, is updated with the new account information. Otherwise, logic proceeds to test 440 wherein the system tests for an EVENT of consequence. Events of concern are typically a payment cycle, a sale of the house or an improvement of the house. In fact, affirmative response to test 440 causes system inquiry as to the event, via test 450, wherein a home improvement is discerned. A home improvement is important, as it represents the owner's investment into the equity of the previously divided property. To the extent that the improvement increases the ultimate purchase price of the house, the owner and not the system manager, should reap the reward.

To insure this outcome, block 460 rewrites the original Contract, DCON(I), to reflect the enhancements associated with the home improvement event submission. In either path, logic continues to test 470 which checks for a Termination event, i.e., the termination of the contract and the sale of the house at market price. If a termination event has occurred (and these include foreclosure, death, etc.), the system accesses the relevant file DCON(I) and processes the records accordingly, block 480.

The foregoing processing is repeated for this cycle for each participant, I, by loop processor Next command of block 490. At the end of the period, a payment run is made, block 500, wherein aggregate payment to the servicer(s) is calculated, the database updated, block 510, and the funds transferred, block 520. Processing is then repeated for the next period by index variable J, via loop processor Next command of block 530.

The above discussion has focused on the retail side of the processing, wherein the plan manager assumes the contractual obligations associated with swapping fixed income for a percentage of market appreciation of the participants' houses. By doing this, the plan manager develops an investment position highly exposed to changes in the real estate market and, in essence, is holding a portfolio of concentrated real estate investments in the form of contract rights. These contract rights are, however, readily assignable and, therefore, easily transferred, traded and exchanged. Therefore, consistent with the desire to diversify and otherwise exchange its position in real estate for other assets, the plan manager is ideally positioned to separately trade the obligations corresponding to the various contracts within the database portfolio. These trades, however, are accomplished on the institutional side of the market, with the primary customers and traders taken from large pension fund managers having a desire to invest in real estate, again as a form of diversification.

Figure 7:
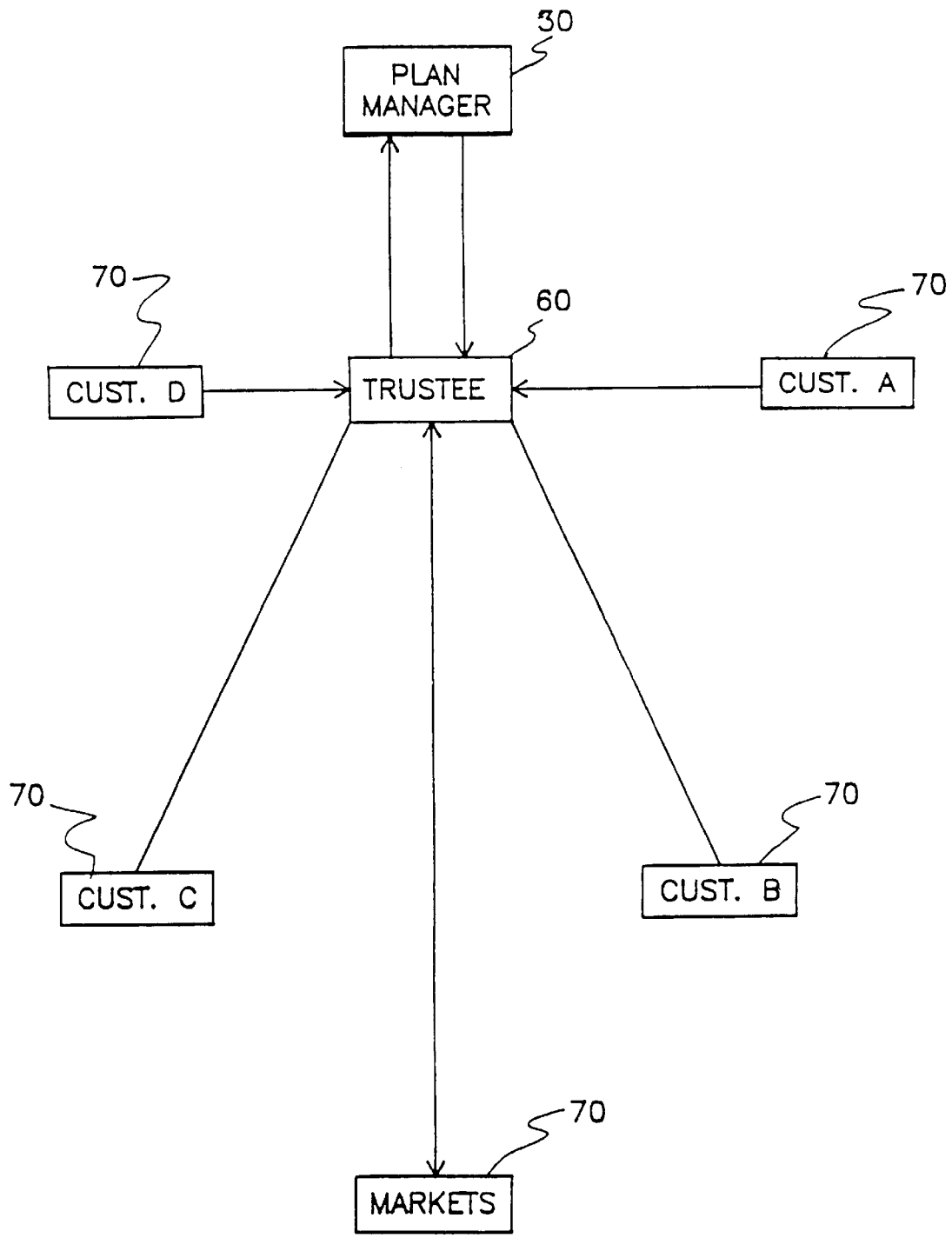
FIG. 7 is a block diagram of the institutional side of the transactions implemented in the context of the present invention.

To effect the institutional side of the system, the plan manager operates through a trustee wherein a swapping arrangement may be accomplished in a manner similar to that discussed above. More particularly, and referring to FIG. 7, the plan manager 30 is linked to a trust 60 for holding transaction supporting assets, like U.S. Treasury bonds. In turn, the trust communicates with various large pension funds 70, exchanging economic interest in bonds for economic interest in the real estate market. For example, CUST A will exchange the exposure of $100 million of 6.25% coupon 30-year treasuries for $100 million of a specified real estate basket. The basket is defined by properties selected in terms of house size, location and type. The plan manager receives the coupons on the treasuries and exchanges them for a lower fund coupon. When a home in the basket is sold, the treasuries are returned plus any appreciation in the house price.

Figure 8:
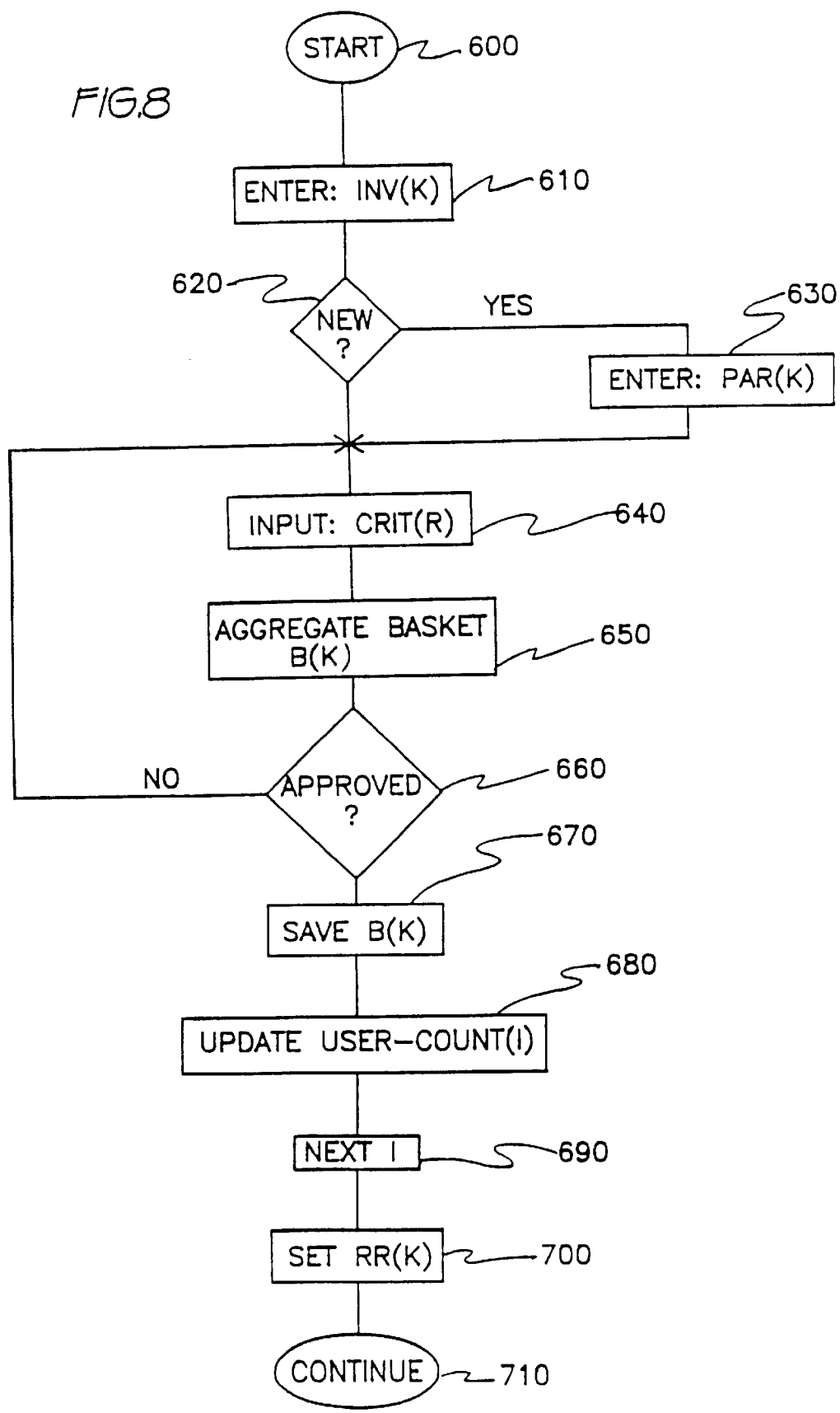
FIG. 8 is a logic flow diagram for the implementation of system interface with institutional investors in accordance with the present invention.

As presented in FIG. 8, processing on the investment side begins with Start block 600 and continues to block 610 for the entry of account data on the Kth investor, INV(K). By this method, each individual investor is given the opportunity to take a selective stake in a real estate investment and the system tracks the plural investor accounts maintained within the database. Continuing in FIG. 8, test 620 determines whether the Kth investor is "new"; if "YES," the system enters that investor's unique parameters, PAR(K), at block 630. Logic proceeds to block 640 where the investor's selective criteria for its stake in terms of location, house style, price bracket, etc. are entered the system then develops a aggregate basket of houses complying with this criteria, designated B(K), at block 650.

The system then determines at test 660 whether this aggregate basket conforms to previously established guidelines; if not, logic is returned to reset the criteria parameters. Approval of the aggregate directs system logic to block 670 wherein the basket parameters are saved. Importantly, the system then updates a separately tracked USER(I) counter(I) indicating the net sales of a stake for each property in that basket. For example, a stake in one house may be sold five times and bought three times—M would thus; equal Z. Thereafter, at block 700, the system establishes the associated rate of return, RR(K) for that particular basket.

As can be recognized from the above, the plan manager must rationalize in real time, continually changing investment positions on both the retail and institutional side with the objective to maintain a balance between each side, i.e., to assure that the exposure to the real estate market taken on the retail side is for the most part taken up by institutional investors, thereby retaining a relatively risk free position. This can only be accomplished by unified processing of the various incoming investment positions and adjusting the qualifying constraints in the system so that balance is re-established. For example, to the extent that four bedroom houses are in demand on the institutional side, the system must reconfigure its retail qualifying terms to insure sufficient supply of four bedroom exposure.

Figure 9:
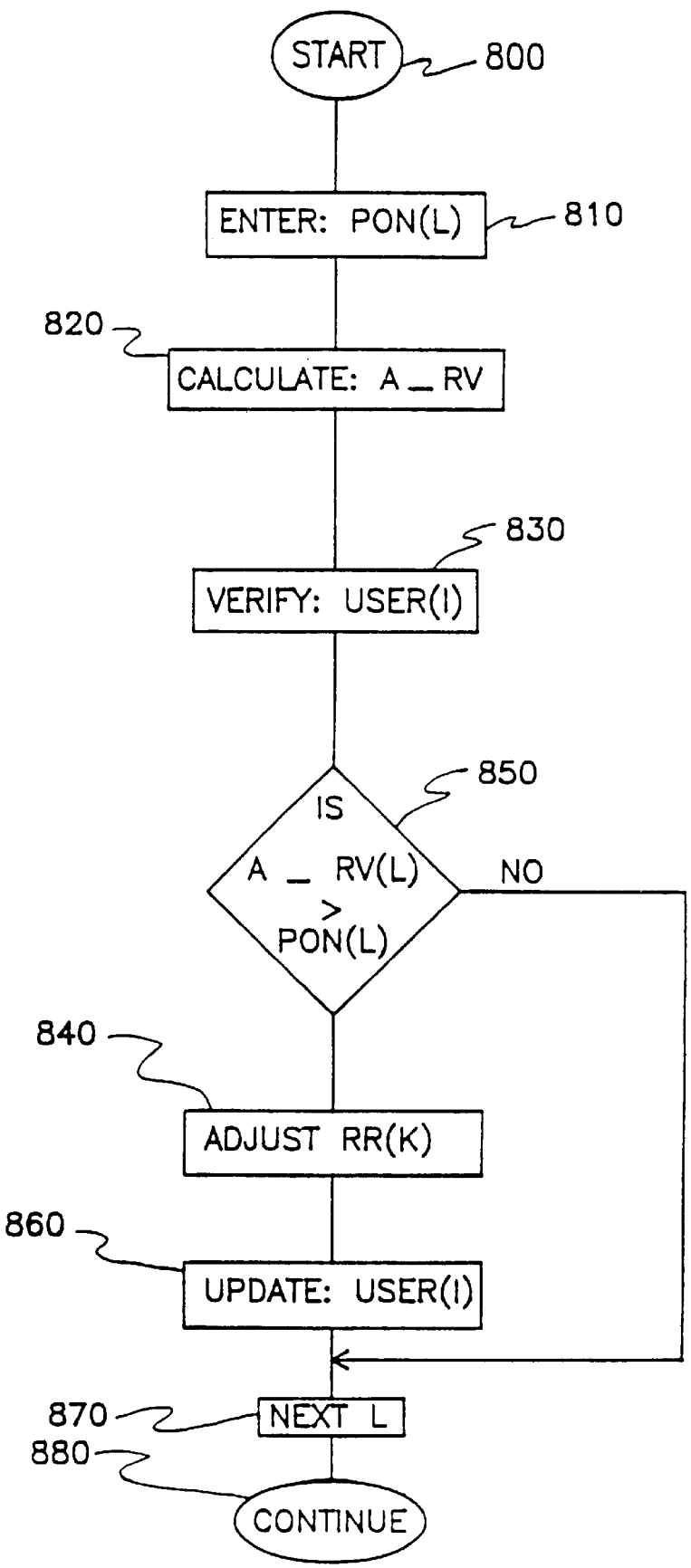
FIG. 9 is a logic flow diagram of the equilibrium function for the present invention.

The inventive system continually updates the relative position of each side of the transaction in accordance with the commands delineated in FIG. 9. Logic conceptual starts at Start block 800, and continues to block 810 wherein the current convergence criteria, PON(L) is accessed and entered. The system then calculates (block 820) the current aggregate position, A_RV. Specifically, A_RV represents the net aggregate position taken for each house for a given territory (state, county or even country). Please note that the A_RV position will include both positive and negative positions, as the system permits investors to take an inverse real estate investment position. This position is explicitly verified on a per house basis (block 830).

At test 840, the absolute value (in dollar terms) of the net position by the system is compared to the convergence criteria PON(L). If within the criteria ("NO" to test 840), logic proceeds to block 870. If "YES", then the direction of imbalance is discerned, and the appropriate qualification parameters adjusted to rebalance the system at blocks 850 and 860, respectively. This is then incremented for the next time frame basket L.

Figure 10:
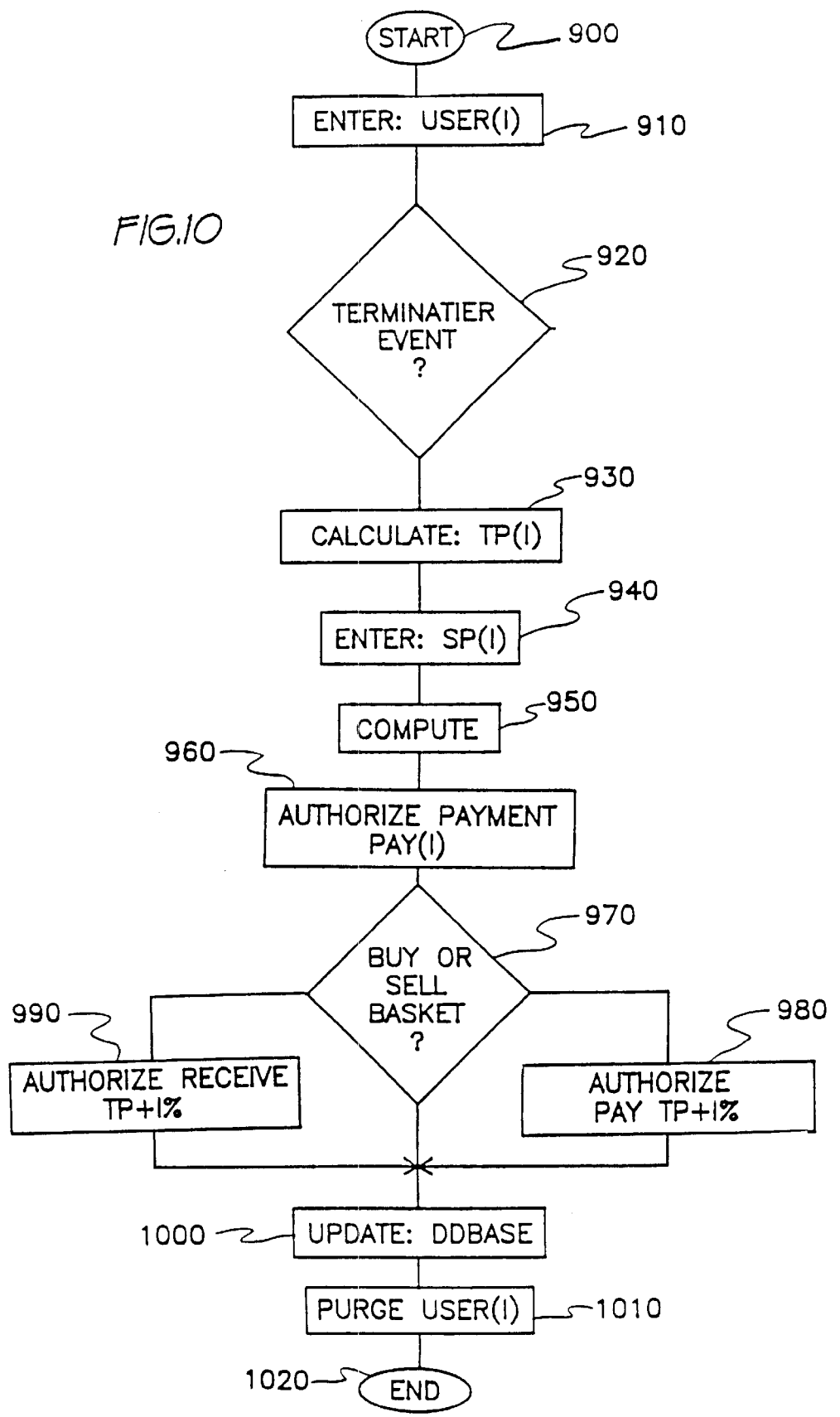
FIG. 10 is a logic flow chart for termination event processing.

Turning now to FIG. 10, the system rationalizes a termination event for investors that have a basket of houses which include the corresponding property. More particularly, logic begins at Start block 900, followed by block 910 wherein the USER(I) file is accessed at test 920, checking for the existence of a termination event. A negative response drives logic to the end of this logic sequence and the (I+1) USER. A positive response to test 920 directs logic to block 930 wherein the terminal payment, TP(I), is calculated based on the incremental time period between payment intervals pursuant to the contract. Thereafter, the sales price SP(I) for the property is entered at block 940. The system then computes the net value of the contract to the system proprietor at block 950; to the extent any amount is due to the USER(I), this amount is authorized for payment at block 960.

At test 970, the system determines, based on the USER counter, how many times the property undergoing a determination event has been bought or sold. For each instance of a purchase by an investor, logic branches to 980 and the system authorizes payment TP+INT(I). For each instance of a sale by an investor, logic proceeds to branch 990 wherein the system is authorized to receive payment TP+INT(I). Logic culminates at block 1000 wherein the DDbase is updated and block 1010 wherein the system is purged of the USER(I) file.

The above-described arrangement is merely illustrative of the principles of the present invention. Numerous modifications and adaptations thereof will be readily apparent to those skilled in this art without departing from the spirit and scope of the present invention.

What is claimed is:

1. A system for managing a plurality of accounts that correspond to a selected position in a future appreciation of a select real estate asset comprising;

data entry means for receiving and processing a select set of parameters corresponding to an applicant for exchanging a position in real estate for a return tied to a non-real estate asset;

database development means for receiving plural account participants and attendant data thereon and storing said data in an addressable database;

participant qualification means for selectively qualifying real estate properties as suitable participants in said system;

system management means for processing incoming participant event data and updating said database in accordance therewith; and investment pool processing means for collecting data on said real estate assets and processing said data to form one or more investment pools, wherein said pools include plural real assets each having at least one common property characteristic.

2. The system of claim 1 wherein said parameters includes a description of a residential building, and a select percentage of ownership interest in the change of value of said building at a future point in time.

3. The system of claim 2 wherein said return on a non-real estate asset is a fixed income to accrue until sale of said building.

4. The system of claim 3 wherein said database includes updated files on each account in terms of percentage ownership in said building.

5. The system of claim 4 further comprising real processor means for selective entry of events for modulating or terminating said percentage of ownership interest.

6. A system for processing data corresponding to a plurality of individual investor accounts:

account processor swap means for converting account parameters into a current income steam and a future correspondence to a valuation change of a select real estate asset, account processor database means for storing and tracking a plurality of separate accounts to effect a net aggregate position and to update said future correspondence to a valuation change due to intervening events, account processor distribution means for distributing a stake in said future correspondence to a valuation change to real estate investors, wherein said distribution means balances a portfolio of investments to insure limited investment exposure by a system manager; and investment pool processing means for collecting data on said real estate assests and processing said data to form one or more investment pools, wherein said pools include plural real estate assets each having at least one common property characteristic.

7. The system of claim 6 wherein said swap means included qualification means to regulate system manager exposure.

8. The system of claim 7 wherein said distribution means includes exposure limit to discern requisite change in account qualification terms.

9. The system of claim 8 wherein said future correspondence is established by a system characterized termination event.

10. The system of claim 6 wherein said intervening events include home improvements.

11. A data processing method for managing a plurality of individual accounts wherein each account corresponds to a participant, wherein said participant owns a real estate asset, said method comprising the steps of:

a) creating an account database of separate participant accounts wherein said database comprises a plurality of account entries and each account entry includes participant information stored in physical memory locations in an addressable memory means, said participation information comprises data on said participant and said real estate asset owned by said participant;

b) inputting data on a periodic and/or event driven basis wherein said inputted data is stored in system memory and includes transactional information relating to one or more of said participant accounts;

c) processing said inputted data in accordance with program controlled logic defining an investment equity contract relationship, exchanging a first exposure in said real estate asset corresponding to a change in value thereof, for a defined return, wherein said processing of said inputted data provides a change in one or more parameters associated to said participant account;

d) creating an aggregate investment pool of real estate assets each having at least one common property characteristic; and e) updating said account database with said changed parameters to support interim report generation and select output of one or more asset activities wherein asset activities include payment of funds to an account participant, and collection of funds pursuant to a real estate asset sale.

12. The method of claim 11 wherein said data processing step includes use of a program controlled digital computer to update account parameters in accordance with periodic events.

13. The method of claim 11 wherein said periodic events includes the transfer of cash or cash equivalent stream to a participant in accordance with stored parameters delineating a fixed return for an exposure to a portion of a defined real estate asset.

14. The method of claim 11 wherein said database entries include descriptive data entries on said underlying real estate assets.

15. The method of claim 11 further comprising the step of inputting investor data comprising data on an investor position in one or more pools of real estate exposures.

16. A system for managing a plurality of real estate equity accounts and a plurality of real estate investor accounts comprising:

a) a first database means for storing in electronic form a series of data entries corresponding to one or more real estate assets;

b) a second database means for storing in electronic form a series of data entries corresponding to one or more investors participating in defined investment relationships in said real estate asset exposures;

c) data processing means for periodic manipulation of said data entries in said first and second database to track and update said databases in accordance with controlling logic, wherein said controlling logic defines a return of income to a group of real estate asset owners and a participation by said investors corresponding to a change in asset value over time, wherein said second database means includes record storage means for aggregated pools of said real estate assets grouped based on at least one common property characteristic.

17. The system of claim 16 wherein said data processing means tracks and updates said plural accounts in accordance with event driven input to said system.

18. The system of claim 16 further comprising output corresponding a periodic payment of a fixed amount to each real estate owner.

19. The system of claim 18 wherein said output includes a periodic statement referencing said payment.

* * * * *